United States Patent
Fuji

(10) Patent No.: US 6,607,239 B1
(45) Date of Patent: Aug. 19, 2003

(54) VEHICLE PILLAR STRUCTURE

(76) Inventor: Atsushi Fuji, c/o Toyota Jidosha Kabushiki Kaisha 1, Toyota-cho, Toyota-shi, Aichi-ken, 471-8571 (JP)

( * ) Notice: Subject to any disclaimer, the term of this patent is extended or adjusted under 35 U.S.C. 154(b) by 0 days.

(21) Appl. No.: 10/111,095

(22) PCT Filed: Oct. 19, 2000

(86) PCT No.: PCT/IB00/01505

§ 371 (c)(1),
(2), (4) Date: Apr. 22, 2002

(87) PCT Pub. No.: WO01/30638

PCT Pub. Date: May 3, 2001

(30) Foreign Application Priority Data

Oct. 28, 1999 (JP) .......................................... 11-306431
Nov. 29, 1999 (JP) .......................................... 11-337477
Jan. 11, 2000 (JP) ........................................ 2000-002400

(51) Int. Cl.$^7$ ................................................. B60J 9/00
(52) U.S. Cl. ................... 296/203.03; 296/188; 296/189
(58) Field of Search ................................ 296/188, 189, 296/203.03, 193

(56) References Cited

U.S. PATENT DOCUMENTS 2,192,075 A * 2/1940 Gregoire
3,724,153 A * 4/1973 Wessells, III et al.
5,570,558 A * 11/1996 Persson

FOREIGN PATENT DOCUMENTS

| DE | 33 07 093 A1 | 9/1983 |
| EP | 0 836 983 A2 | 4/1998 |
| EP | 0 952 067 A2 | 10/1999 |
| JP | A 6-503778 | 4/1994 |
| JP | A 6-286646 | 10/1994 |
| JP | A 6-286650 | 10/1994 |
| JP | A 6-286651 | 10/1994 |
| JP | A 7-118783 | 5/1995 |
| JP | A 11-192968 | 7/1999 |
| WO | WO 92/11158 | 7/1992 |

* cited by examiner

*Primary Examiner*—Stephen T. Gordon
*Assistant Examiner*—Scott Carpenter
(74) *Attorney, Agent, or Firm*—Oliff & Berridge, PLC

(57) ABSTRACT

A lightweight pillar structure having high absorbing effect of impact energy is provided. A center pillar (12) made of a light alloy is formed of a pillar body (20) and a functional part mounting portion (22) integrally formed together. The functional part mounting portion (22) is a cylindrical hollow boss, and a slide rail (126) is mounted to a thread portion formed in an inner periphery of the cylindrical hollow boss. The slide rail (126) is formed so as not to project from an inner side face of a center pillar (12) of a passenger compartment inward of the passenger compartment. Ribs (30) as deformation control means are integrally formed on an upper portion (12D) of the center pillar (12). The ribs (30) control a deformation mode of the center pillar (12) against side impact.

20 Claims, 16 Drawing Sheets

FIG. 15
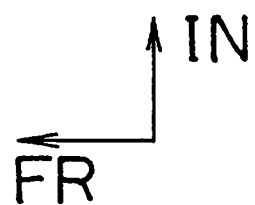
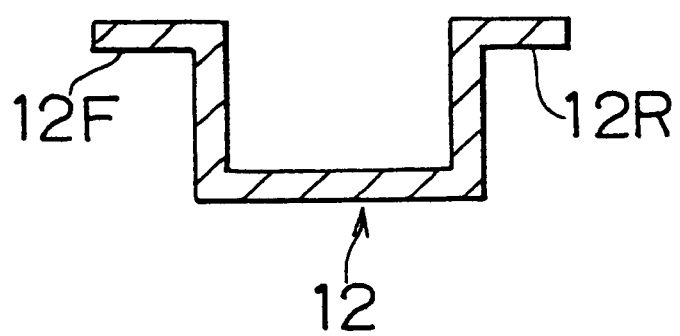

F I G. 17
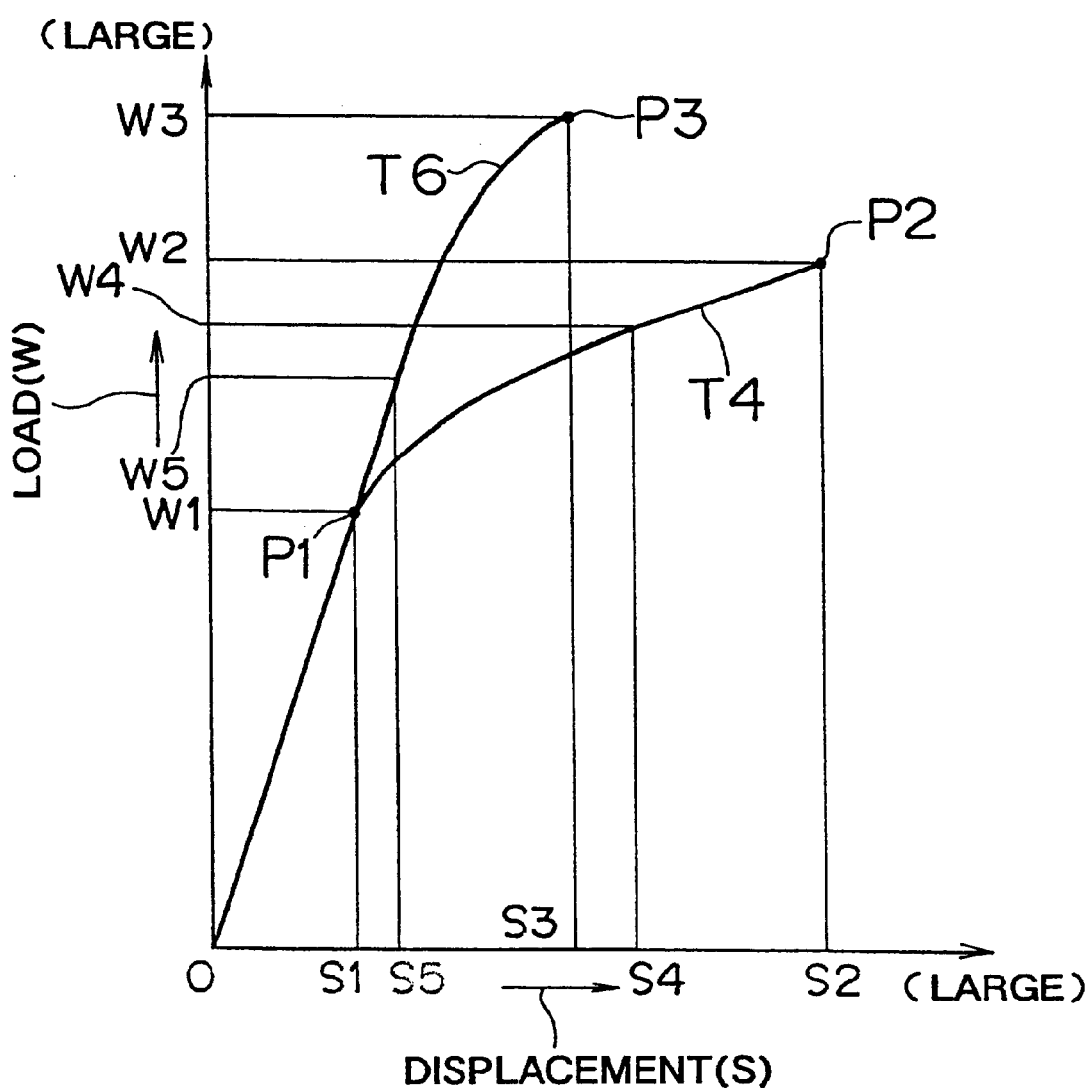

VEHICLE PILLAR STRUCTURE

BACKGROUND OF THE INVENTION

1. Field of the invention

The invention relates to a pillar structure, and more particularly, to a pillar structure applied to a body of an automobile.

2. Description of the Related Art

FIG. 20 shows an example (WO92/11158) of a pillar structure applied to a body of an automobile.

A center pillar 70 is made of an extruded material or casting material. The center pillar 70 is provided with members 72, 74, 76, 78, 80 and 82 which are cut such that their heights are different from one another stepwisely.

In the aforementioned structure, the number of parts constituting the pillar is increased and thus, a weight of the pillar itself is adversely increased. When a function part (such as a shoulder belt anchor) is mounted to the center pillar 70, it is necessary to secure mounting means (such as a bracket) by welding or the like for supporting the function part to the center pillar 70. As a result, the number of parts is further increased and a mass thereof is increased.

EP 0 836 983 A2 discloses a pillar structure capable of incorporating the function part within a cross section of a pillar, and having a horizontal cross section opened toward the inner side of a passenger compartment.

When a load such as a collision is applied to such a pillar from its side, it is difficult to deform the pillar in a desired deformation mode, and impact energy can not be absorbed efficiently in some cases.

Furthermore, EP 0 952 067 A2 shows a center pillar for a vehicle having an open cross-section over its whole length, wherein an opening thereof is open towards the passenger compartment. Reinforcing ribs are provided inside the cross-section of the pillar. In case of a side impact, the sharp edges will approach passengers, thus increasing risk of injury. Accordingly additional cover means have to be provided to maintain security of the passengers

DISCLOSURE OF THE INVENTION

It is an object of the invention to provide a pillar structure capable of saving weight and enhancing absorbing effect of impact energy. This object is solved with a pillar having the features of claim 1.

BRIEF DESCRIPTION OF THE DRAWINGS

FIG. 15 is a sectional view taken along the line XV—XV of FIG. 14;

FIG. 17 is a graph showing a relation between tensile load and displacement of an aluminum alloy;

DESCRIPTION OF THE PREFERRED EMBODIMENTS

Figure 1:
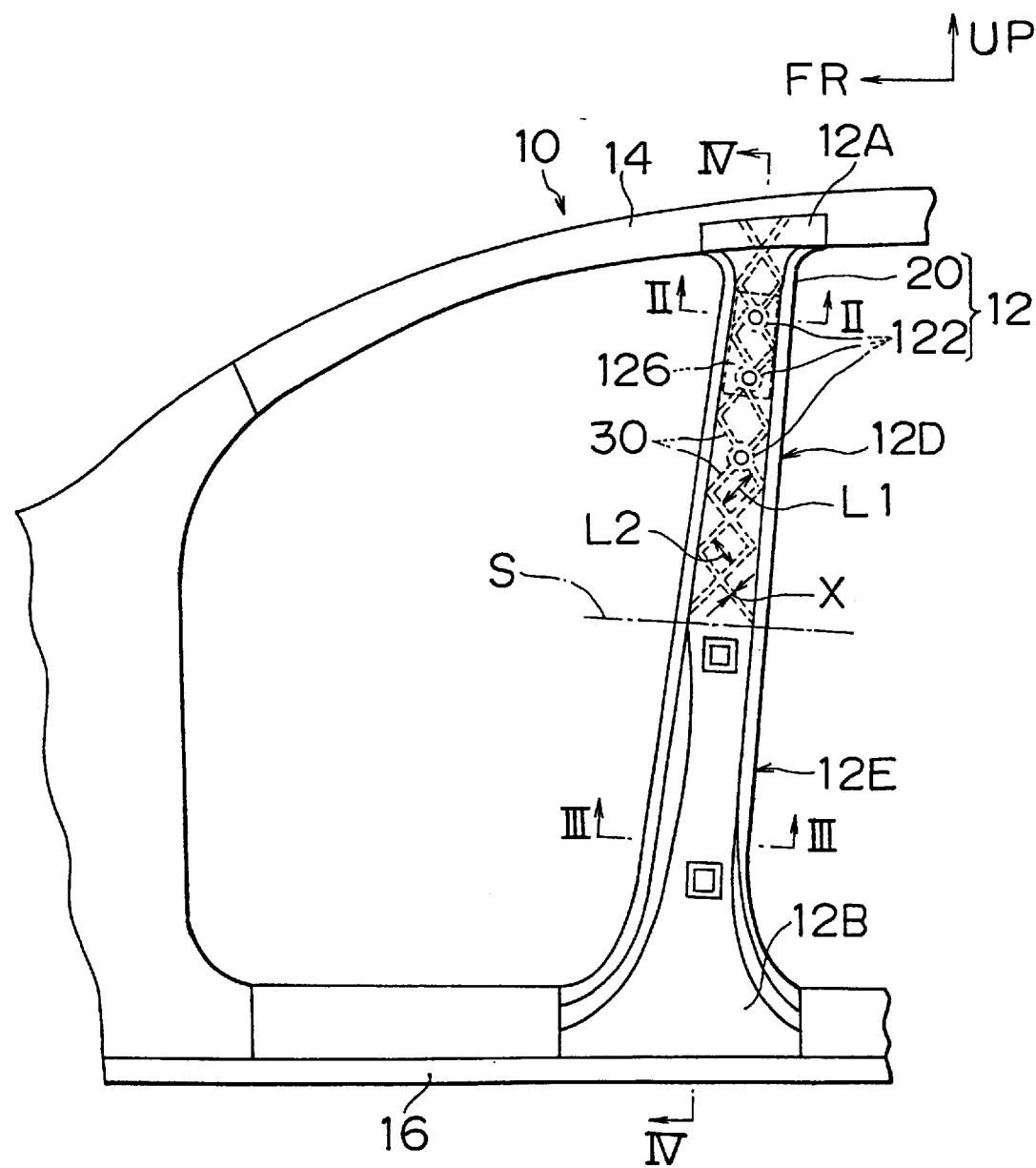
FIG. 1 is a side view of a pillar structure according to a first embodiment of the invention as viewed from inside of a passenger compartment.

First, a pillar structure of a first embodiment of the invention will be explained with reference to FIGS. 1 to 3.

In the drawings, arrow FR indicates the forward direction of a vehicle, arrow UP indicates the upward direction of the vehicle, and arrow IN indicates the inward direction of a vehicle width.

As shown in FIG. 1, a pillar structure of the present embodiment is applied to each of left and right center pillars 12 of a vehicle 10. An upper end 12A of each center pillar 12 is connected to a roof side rail 14, and a lower end 12B of the center pillar 12 is connected to a rocker 16. The center pillar 12 is made of casting of light alloy (such as aluminum alloy and magnesium alloy).

An upper portion 12D of the center pillar 12 which is higher than a substantially central portion of the center pillar 12 (position shown with a chain line in FIG. 1) in a vertical direction of the vehicle is integrally formed within its opened cross section with ribs 30 as deformation mode control means in the form of rhombus grid as viewed from side. A plurality of (three, in the present embodiment) function part mounting portions 122 are formed on intersections of the ribs 30 at a central area of the center pillar 12 in the longitudinal direction of the body.

Figure 2:
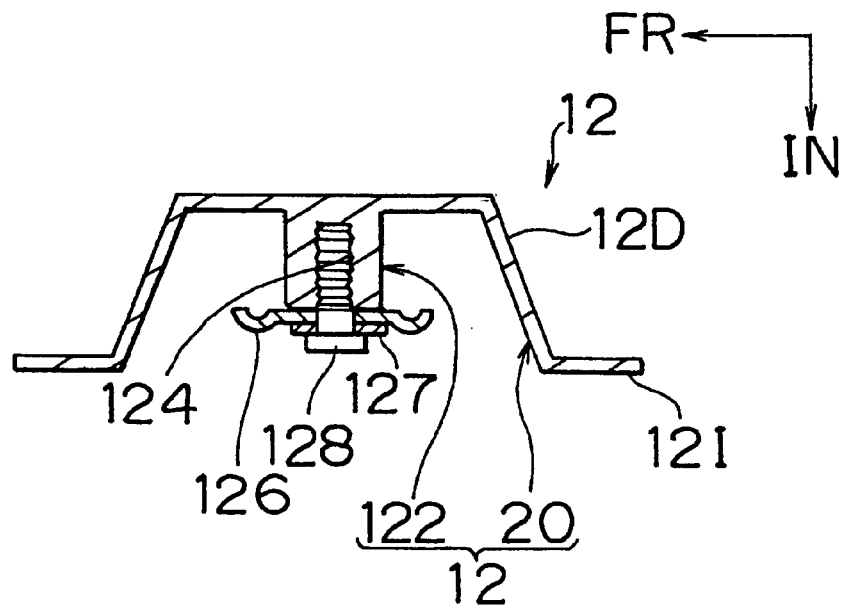
FIG. 2 is a sectional view taken along the line II—II of FIG. 1.
Figure 3:
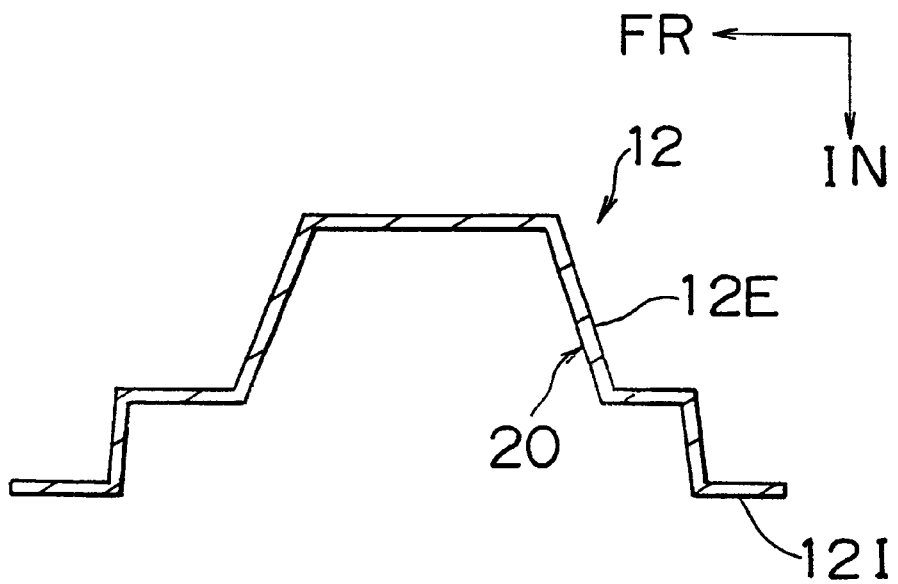
FIG. 3 is a sectional view taken along the line III—III of FIG. 1.

FIG. 2 is a sectional view (of the upper portion of the pillar) taken along the line II—II of FIG. 1, and FIG. 3 is a sectional view (of a lower portion of the pillar) taken along the line III—III of FIG. 1.

As shown in FIGS. 2 and 3, the center pillar 12 has an opened cross sectional structure having an opening directed to the inner side of the passenger compartment.

The center pillar 12 includes a pillar body 20 of the opened cross sectional structure and the function part mounting portions 122. The pillar body 20 and the function part mounting portions 122 are integrally formed together. Each of the function part mounting portions 122 is a cylindrical hollow boss, and a thread portion 124 is formed on an inner periphery of the cylindrical hollow boss. A slide rail 126 of an adjustable shoulder belt anchor as a function part is mounted to the thread portion 124 by means of a mounting member 128 (such as a screw) through a washer 127.

Figure 4:
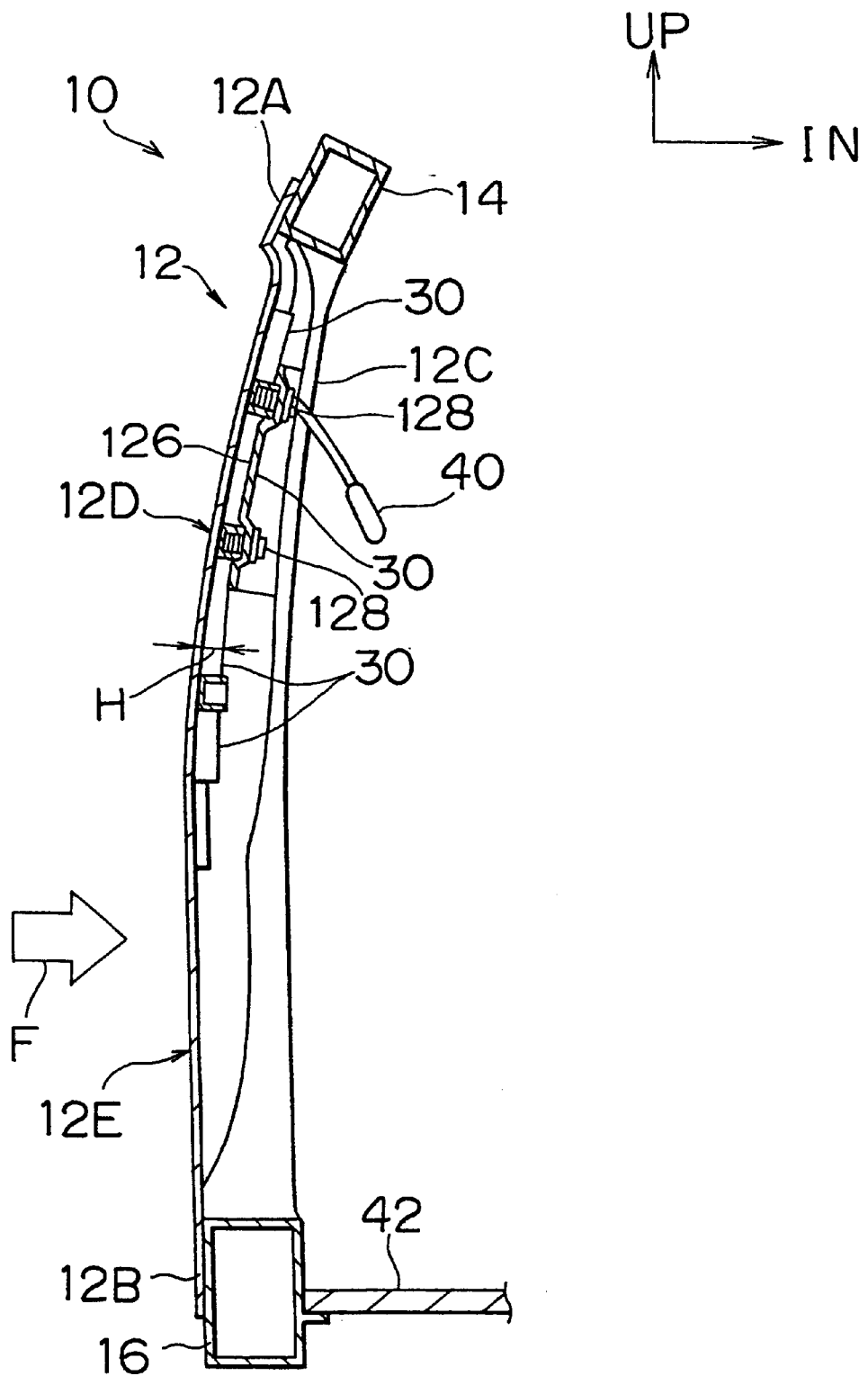
FIG. 4 is a sectional view taken along the line IV—IV of FIG. 1.

FIG. 4 is a (vertical) sectional view of the center pillar 12 taken along the line IV—IV of FIG. 1.

As shown in FIG. 4, the slide rail 126 and the mounting member 128 are accommodated in the opened cross section of the center pillar 12 such that they do not project inward of the passenger compartment from an inner side 12I of the passenger compartment.

A slip joint 40 of the adjustable shoulder belt anchor is mounted to the center pillar 12. A lower portion of the center pillar 12 is connected to a floor panel 42.

In the pillar structure of the present embodiment, since the pillar body 20 of the center pillar 12 and the function part mounting portions 122 are integrally formed, it is unnecessary to separately mount a bracket or the like for mounting the function part to the pillar body. Therefore, its mass can be reduced.

Each of the function part mounting portions 122 is formed of the hollow boss provided with the thread portion 124 therein. It is possible to effectively reinforce the fewest possible portions (fastening portions). Further, since the function part-mounting portion 122 is formed as the hollow boss, a required strength can be ensured without consideration of standard shape unlike a nut. As a result, the fastening portion can effectively be reinforced with a small mass.

According to the pillar structure of the present embodiment, the slide rail 126 and the mounting member 128 are accommodated in the opened cross section of the center pillar 12 such that they do not project inward of the passenger compartment (downward in FIG. 2) from the inner side 12I of the passenger compartment. As a result, the space in the passenger compartment can be widened.

Further, since the ribs 30 can control the deformation mode of the center pillar 12 against a side collision, it is possible to control the deformation mode of the pillar against side impact without separately providing the pillar body 20 with deformation mode control means. A desired pillar deformation mode can easily be obtained by changing a thickness X, distances L1, L2, configuration of the rib 30 shown in FIG. 1, and a height H of the rib 30 shown in FIG. 4.

In the pillar structure of the present embodiment, the ribs 30 are formed only on the upper portion 12D of the center pillar 12. As a result, when a load is applied to the center pillar 12 from outside in the lateral direction of the body (arrow F in FIG. 4), a lower portion 12E of the center pillar 12 located at outer side (left side in FIG. 4) in the lateral direction of the body with respect to the upper portion 12D of the center pillar 12 is displaced towards the inner side in the lateral direction of the body. As a result, an amount of the entire center pillar 12 entering in the passenger compartment can be reduced.

The present embodiment may employ a structure in which the ribs 30 as the deformation mode control means are not used, a thickness of the upper portion 12D of the pillar body 20 is made thicker than the lower portion 12E so that the lower portion 12E is more likely to be deformed than the upper portion 12D. Alternatively, only the upper portion 12D of the pillar body 20 may be subjected to a thermal treatment so that the lower portion 12E is more likely to be deformed than the upper portion 12D. Additionally, both portions may be subjected to respective different thermal treatments as is described later with reference to the third embodiment.

Alternatively, the ribs may be formed on both the upper portion 12D and the lower portion 12E such that the ribs on the upper portion 12D are denser than those on the lower portion 12E. A shape of the rib 30 is not limited to the rhombus grid as viewed from side, and it may be of another shape such as a ladder-like shape as viewed from side.

Although it was explained that the slide rail 126 was mounted in the center pillar 12 as the function part in the present embodiment, another function part such as a room lamp other than the slide rail can also be applied to the pillar structure of the invention.

Further, the pillar structure of the present embodiment can also be applied to another pillar such as a front pillar and a quarter pillar.

Next, a second embodiment of the invention will be explained.

Figure 5:
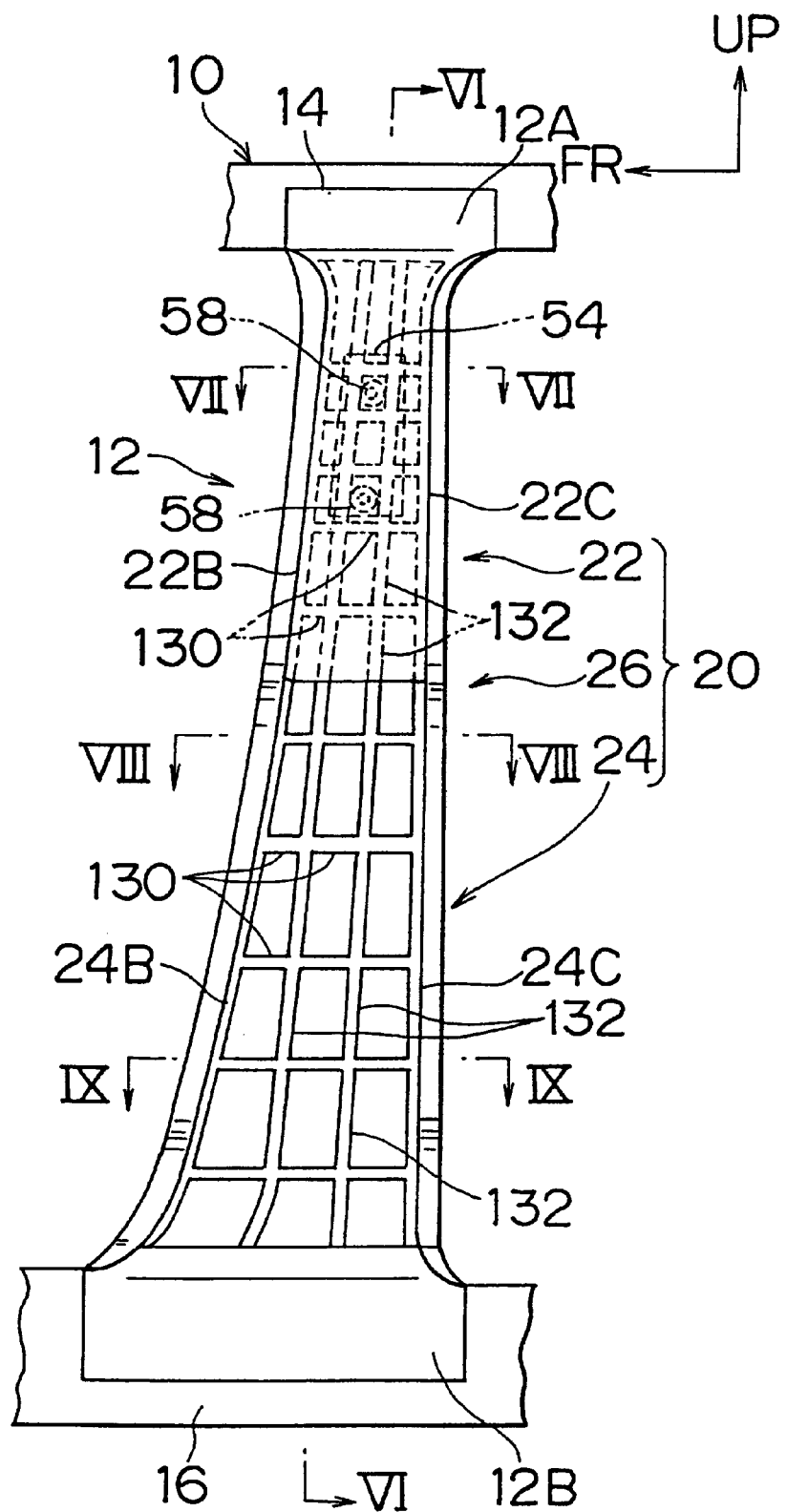
FIG. 5 is a side view of a pillar structure according to a second embodiment of the invention as viewed from outside of a vehicle.

A center pillar 12 of the present embodiment is shown in FIG. 5.

The same members as those of the first embodiment are designated with the same symbols, and explanation thereof is omitted.

Figure 6:
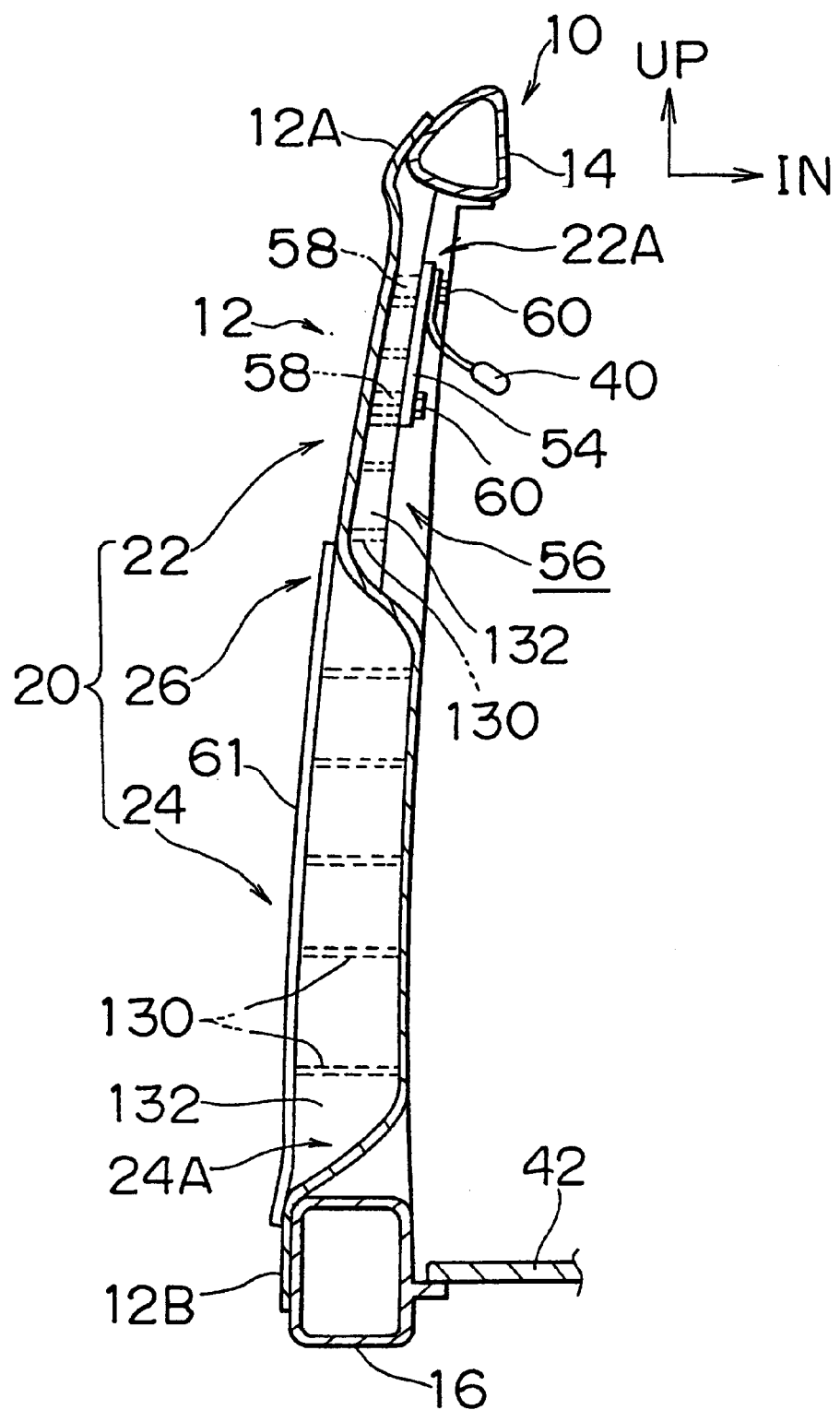
FIG. 6 is a sectional view taken along the line VI—VI of FIG. 5.

As shown in FIG. 6, the center pillar 12 of the second embodiment includes a first portion 22 and a second portion 24 of a pillar body, and a cross-section switching portion 26 that is a connecting member for connecting the first and second portions to each other.

Figure 7:
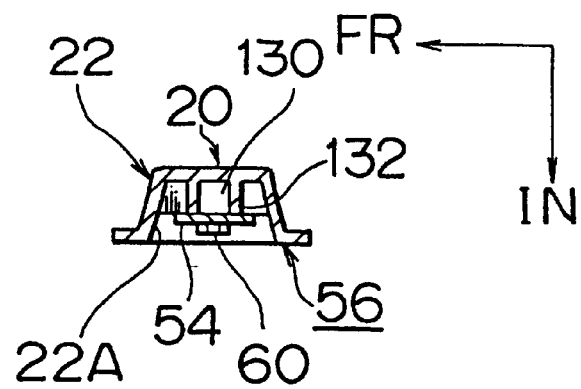
FIG. 7 is a sectional view taken along the line VII—VII of FIG. 5.

The first portion 22 of the pillar body has a hat-like opened cross sectional structure (FIG. 7) having an opening 22A directed to the inner side of the passenger compartment.

Figure 8:
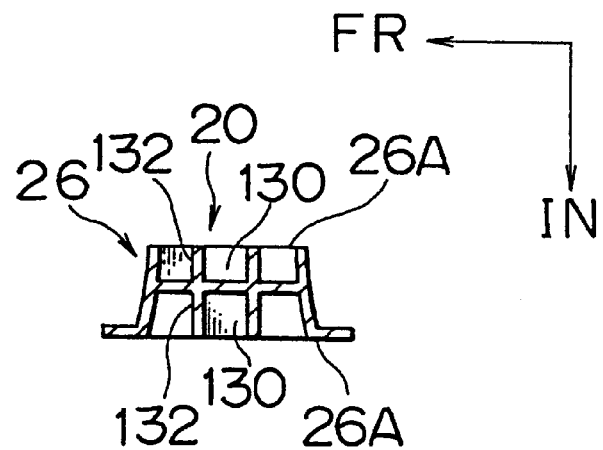
FIG. 8 is a sectional view taken along the line VIII—VIII of FIG. 5.

In the cross-section switching portion 26, a direction of an opening 26A is switched from the inside to the outside of the passenger compartment (FIG. 8).

Figure 9:
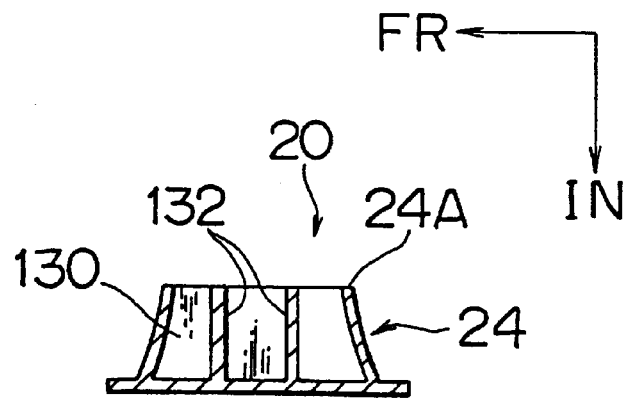
FIG. 9 is a sectional view taken along the line IX—IX of FIG. 5.

The second portion 24 of the pillar body is of a hat-like opened cross sectional structure having an opening 24A directed to the outside of the passenger compartment (FIG. 9).

As shown in FIG. 5, the cross-section switching portion 26 is located at a substantially central portion of the pillar body 20 in its longitudinal direction (vertical direction of the vehicle), and a portion of the pillar body 20 which is higher than the cross-section switching portion 26 is the first portion 22. A portion of the pillar body 20 lower than the cross-section switching portion 26 is the second portion 24.

In this embodiment, in order to alleviate an impact against the pillar such as side impact, lateral ribs 130 (reinforcing means) for substantially horizontally connecting front and rear wall portions 22B, 22C and 24B, 24C to each other, and vertical ribs 132 extending in the longitudinal direction of the pillar body 20 are formed within the cross sections of the first portion 22 and the second portion 24 of the pillar body 20.

As shown in FIG. 6, a concave portion 56 is formed in the cross section of the first portion 22 of the pillar body 20 from inner side of the passenger compartment. A seat belt anchor bracket 54 (function part) is accommodated in the concave portion 56. Therefore, the seat belt anchor bracket 54 does not project from the inside of the passenger compartment of the center pillar 12 inward of the passenger compartment. A pair of upper and lower cylindrical hollow bosses 58 are formed in a bottom of the concave portion 56, and threads are formed on inner peripheries of the hollow bosses 58. The seat anchor bracket 54 is mounted to the threads of the hollow bosses by means of a mounting member 60 such as a bolt.

A decorative laminated sheet 61 which does not influence upon deformation of the center pillar 12 in the aspect of strength is provided on an outer side of the lower portions of the second portion 24 of the pillar body 20 and the cross-section switching portion 26 (see FIG. 6). The decorative laminated sheet 61 is made of resin, thin metal plate or the like, and closes the opening to secure an outward appearance quality.

According to the pillar structure of the present embodiment, a portion of the center pillar 12 which is higher than the substantially central portion thereof in the longitudinal direction of the pillar body 20 can be formed as the first portion 22, and a portion of the center pillar 12 which is desired to be deformed when a large load such as side impact is applied and which is lower than the substantially central portion in the longitudinal direction of the pillar body 20 can be formed as the second portion 24. The first portion 22 and the second portion 24 of the pillar body 20 can be connected to each other through the cross-section switching portion 26 at which the opening is switched from outside to inside of the passenger compartment.

As a result, the space of the passenger compartment can be increased by providing the seat belt anchor bracket 54 in the concave portion 56 of the first portion 22 of the pillar body 20. Further, at the time of side impact, a bumper 66 of the other vehicle shown in FIG. 10 first comes into contact with the second portion 24 of the pillar body 20 is likely to be deformed in the desired deformation mode as shown in FIG. 11 and thus, absorbing effect of impact energy can be enhanced. As a result, the pillar structure becomes highly practical.

Further, since the lateral ribs 130 and the vertical ribs 132 are respectively formed in the cross sections of the first portion 22 and the second portion 24 of the pillar body 20, a desired deformation mode can easily be obtained by adjusting a degree of reinforcement of the lateral ribs 130 and the vertical ribs 132, more specifically, height, thickness, distance, position and the like of the lateral ribs 130 and the vertical ribs 132.

Figure 10:
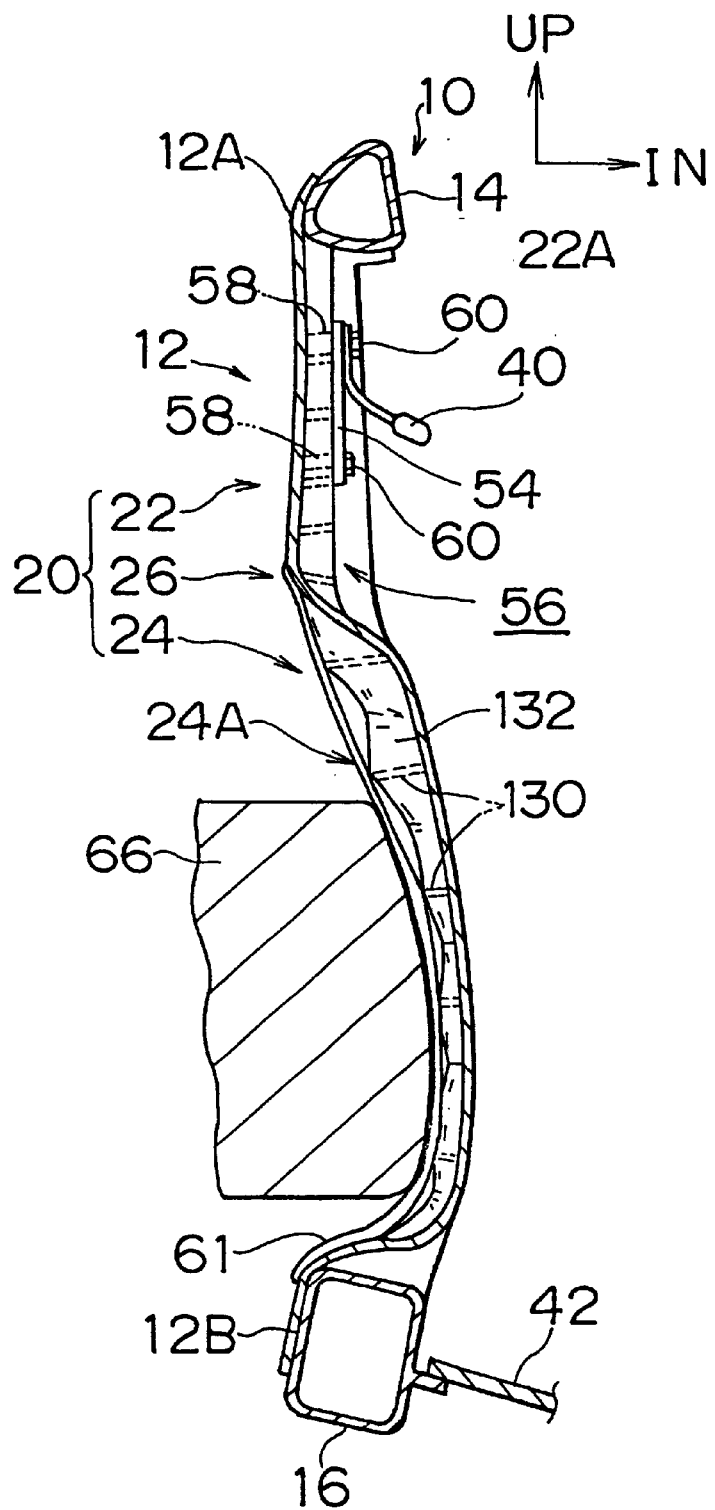
FIG. 10 is a view showing a deformed state of the pillar structure of the second embodiment.
Figure 11:
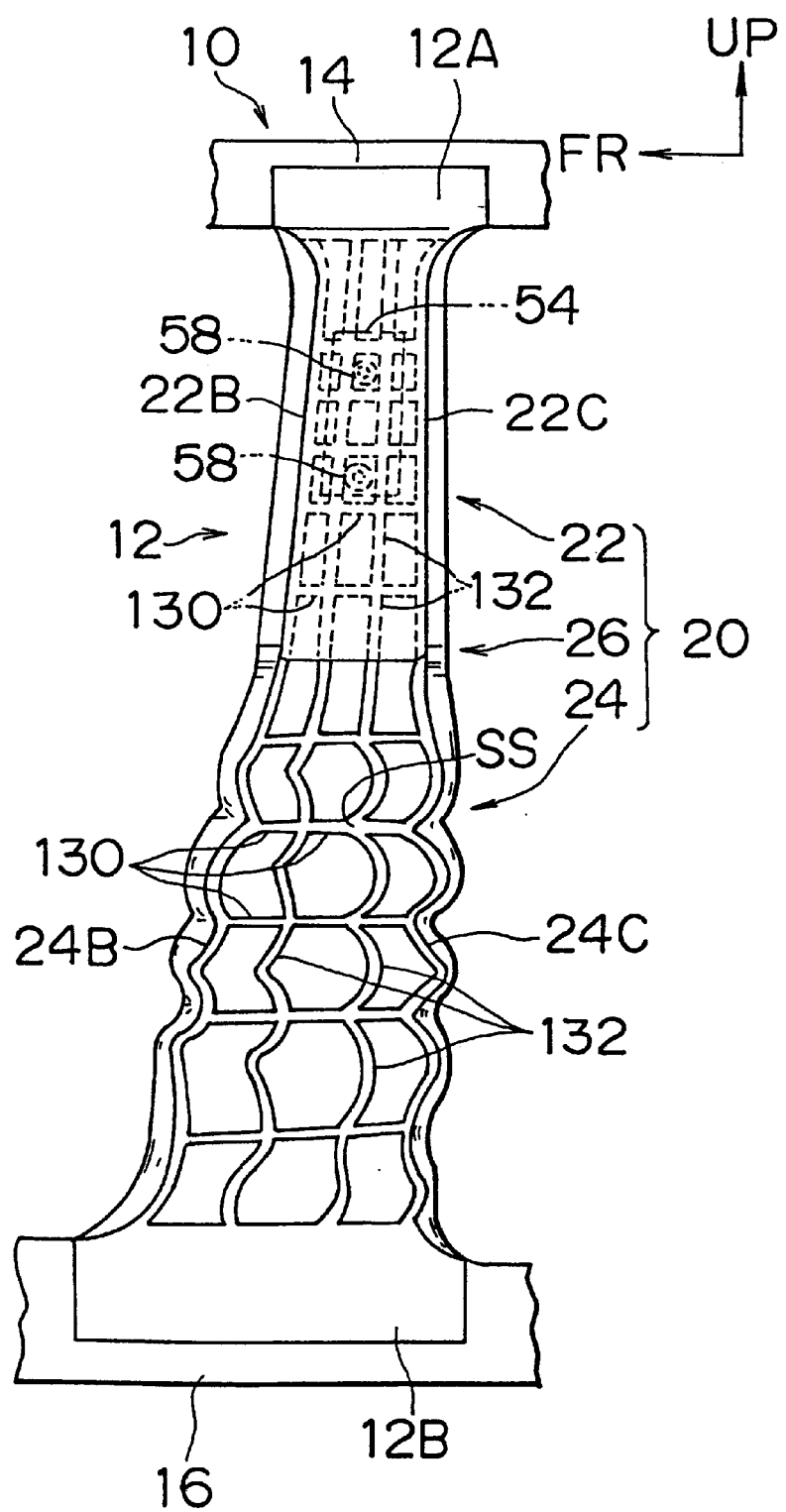
FIG. 11 is a view showing a deformed state of the pillar structure of the second embodiment.

That is, as shown in FIG. 10, the bumper of the vehicle 66 abuts against the second portion 24 of the pillar body 20 at the time of side impact, and when a load is applied to the second portion 24 of the pillar body 20 from outside in the lateral direction of the vehicle, the lateral ribs 130 can prevent the vertical ribs 132 from falling (see FIG. 11). As a result, the vertical ribs 132 are largely deformed, and the absorbing effect of the impact energy is enhanced. Further, since the vertical ribs 132 are largely deformed at upper and lower opposite-sides interposing the intersection SS between the lateral ribs 130 and the vertical ribs 132, the number of deformation points is increased, and the absorbing effect of the impact energy is further enhanced.

According to the present embodiment, the first portion 22 of the pillar body 20 is formed with the concave portion 56 for accommodating the seat belt anchor bracket 54 within the cross section of the first portion 22, and the lateral ribs 130 and the vertical ribs 132 can also be provided in portions (bottom of the concave portion 56) other than the concave portion 56 in the first portion 22 of the pillar body 20. Therefore, the seat belt anchor bracket 54 can be accom- modated in the cross section while maintaining the required strength of the pillar.

Although the lateral ribs 130 and the vertical ribs 132 are formed in the present embodiment, both the lateral ribs 130 and the vertical ribs 132 may not be formed in the first portion 22 of the pillar body 20.

Figure 12:
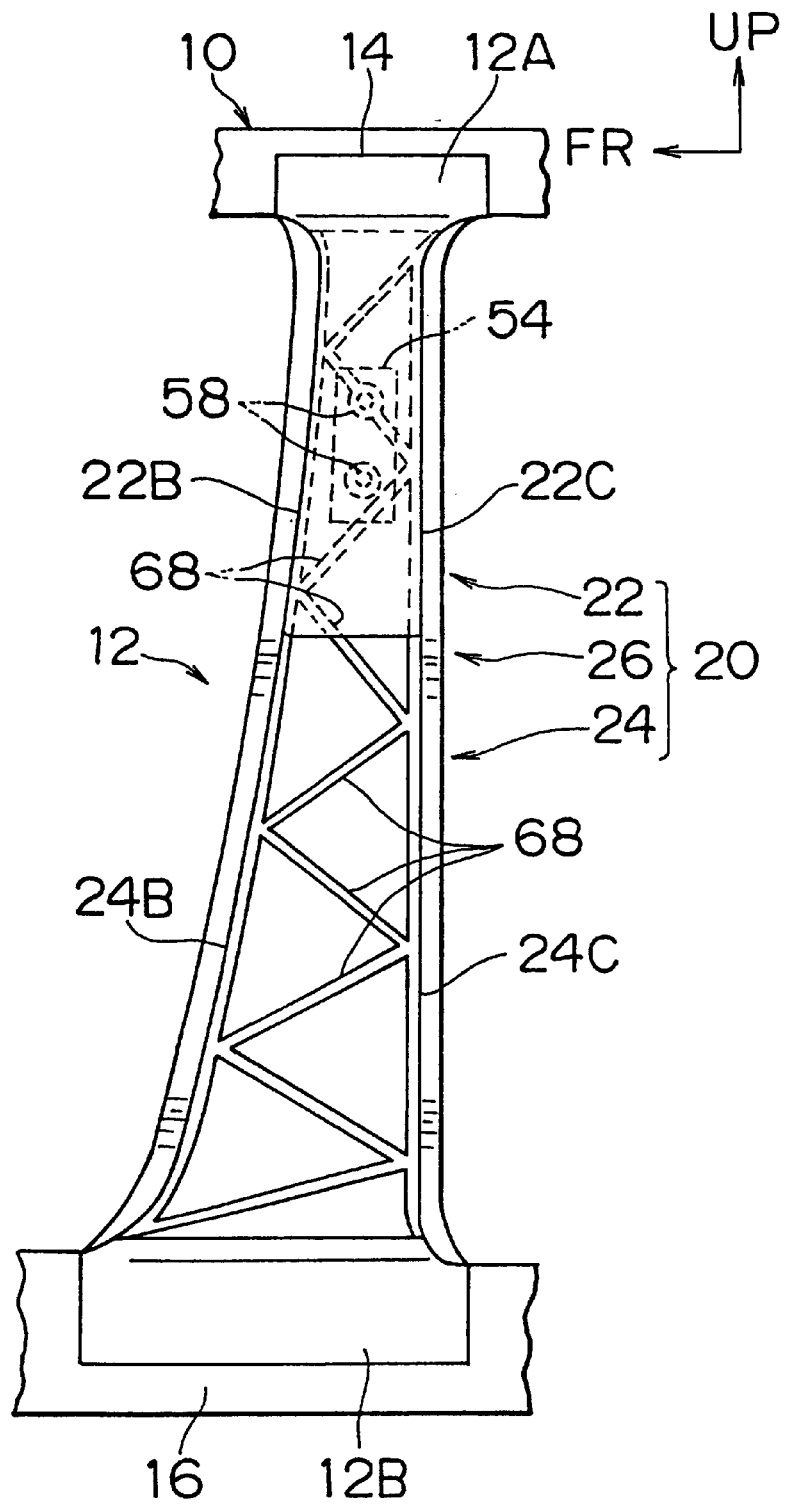
FIG. 12 is a sectional view of the pillar structure of the second embodiment as viewed from outside the vehicle.
Figure 13:
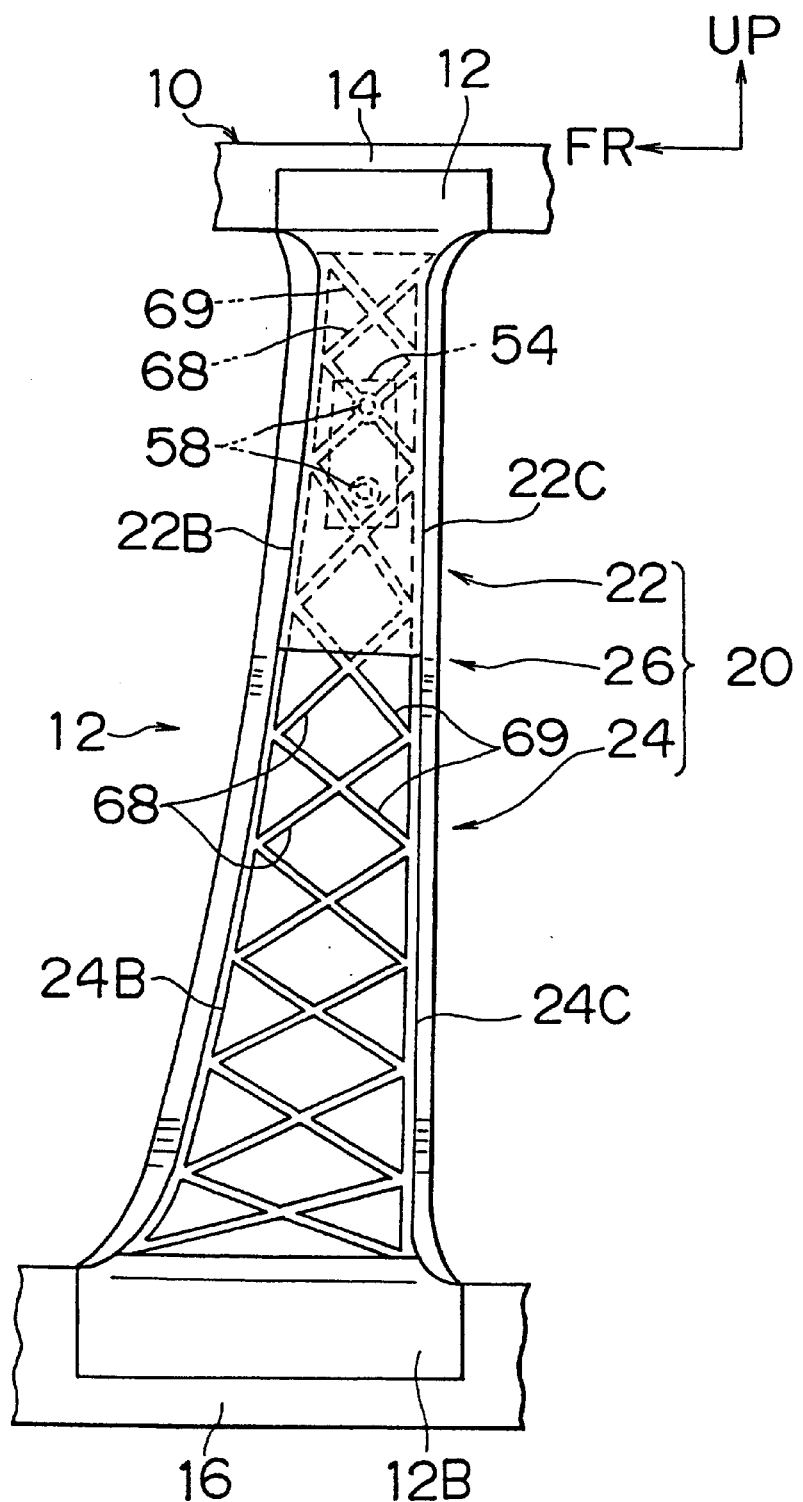
FIG. 13 is a sectional view of the pillar structure of the second embodiment as viewed from outside the vehicle.

The reinforcing means may be inclined ribs 68 for diagonally connecting the front and rear wall portions 22B, 22C and 24B, 24C to each other (FIG. 12). Alternatively, the inclined ribs 68 and inclined ribs 69 may constitute the reinforcing means (FIG. 13).

The reinforcing means is not limited to the rib, and it may be other structure such as a thick portion so long as it is provided at least in the cross section of the second portion 24 of the pillar body 20 for connecting the front and rear wall portions 24B and 24C.

The pillar structure of the invention can also be applied to other pillars such as a front pillar and a quarter pillar. A position of the cross-section switching portion is not limited to the substantially central portion of the pillar body in the longitudinal direction. Further, the second portion 24 may be a portion of the pillar body 20 which is higher than the cross-section switching portion and may have the opened cross sectional structure whose opening is directed to the outside of the passenger compartment. The first portion of the pillar body may be a portion of the pillar body 20 which is lower than the cross-section switching portion and may have the opened cross sectional structure whose opening is directed to the inner side of the passenger compartment.

Next, a third embodiment of the invention will be explained.

Figure 14:
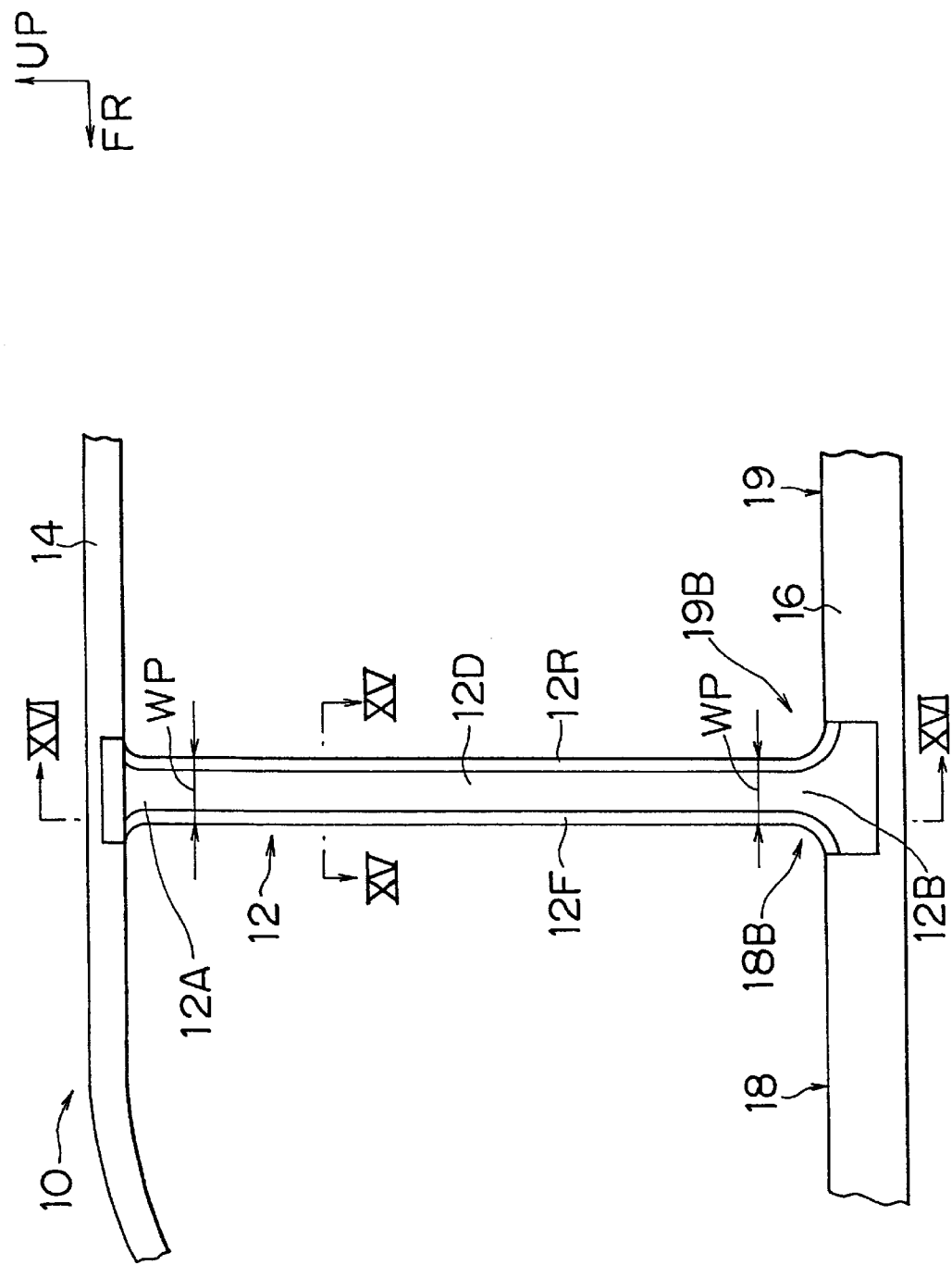
FIG. 14 is a sectional view of a pillar structure according to a third embodiment of the invention as viewed from outside of the vehicle.

FIG. 14 shows a center pillar 12 of the third embodiment.

The same members as those of the first embodiment are designated with the same symbols, and explanation thereof is omitted.

As shown in FIG. 14, a longitudinal width WP of the center pillar 12 is substantially uniform. Therefore, as compared with a conventional body structure, a portion 18B of a front side door opening 18 in the vicinity of a lower end 12B of the center pillar 12 is wider, and a portion 19B of a rear side door opening 19 in the vicinity of a lower portion 12B of the center pillar 12 is also wider.

As shown in FIG. 15, the center pillar 12 has a rectangular and substantially opened cross section, and the center pillar 12 is formed at its inner side in the lateral direction of the body with flanges 12F and 12R directed forward and rearward.

Figure 16:
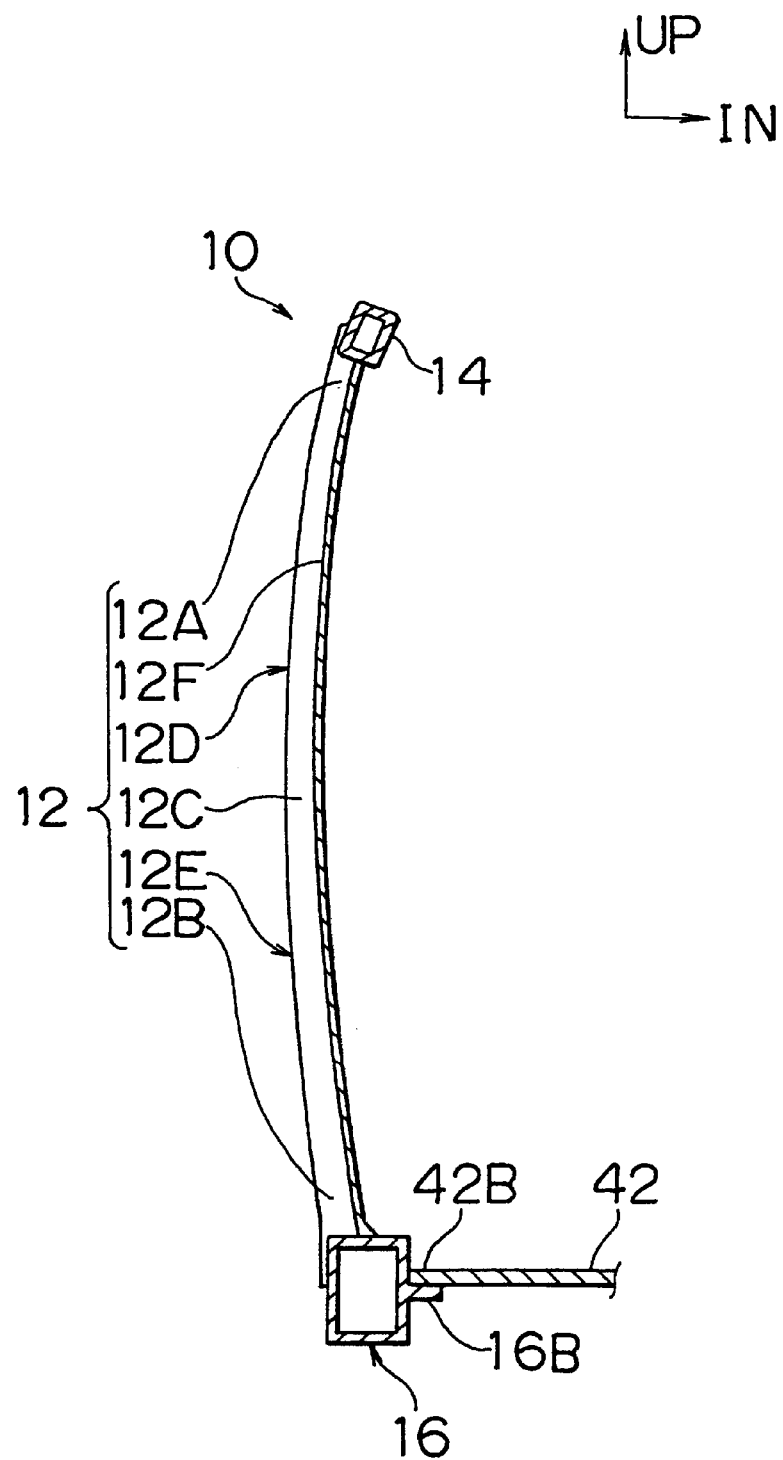
FIG. 16 is a sectional view taken along the line XVI—XVI of FIG. 14.

FIG. 16 is a sectional view of the pillar 12 as viewed from left side of FIG. 14. A rocker 16 is formed with a flange 16B extending inward in the lateral direction of the vehicle, and each of opposite end edges 42B of the floor panel 42 in the lateral direction of the vehicle is connected to the flange 16B.

A portion (upper portion or first member, hereinafter) 12D of the center pillar 12 higher than the central portion 12C is subjected to a T6 thermal treatment (i.e., aluminum alloy is subjected to a solution treatment and then subjected to an artificial aging), and this portion has small elongation with respect to a load. A portion (lower portion or second member, hereinafter) 12E of the center pillar 12 lower than a substantially central portion 12C in the longitudinal direction is subjected to a T4 thermal treatment (i.e., aluminum alloy is subjected to a solution treatment and then subjected to an aging at a room temperature). As a result, this portion has great elongation with respect to a load. Although not shown in FIGS. 14 to 16, the upper portion 12D of the center pillar 12 is provided with function part mounting members e.g. in the form described with reference to the first and second embodiment.

FIG. 17 shows a result of a tensile test of aluminum alloy subjected to the T4 or T6 thermal treatment. An elongation (displacement) S with respect to a load remains the same up to a bifurcation P1 at which a load W becomes W1 and the displacement S becomes S1, but if the load exceeds the bifurcation P1, an increasing amount of displacement of aluminum subjected to the T4 thermal treatment with respect to an increasing amount of load becomes greater than an increasing amount of displacement of aluminum subjected to the T6 thermal treatment. A displacement S2 at a breaking point P2 of the T4 thermal treatment is greater than a displacement S3 of a breaking point P3 of the T6 thermal treatment (S2>S3), and a load W2 of the breaking point P2 of the T4 thermal treatment is smaller than a load W3 of the breaking point P3 of the T6 thermal treatment (W2<W3).

Figure 18:
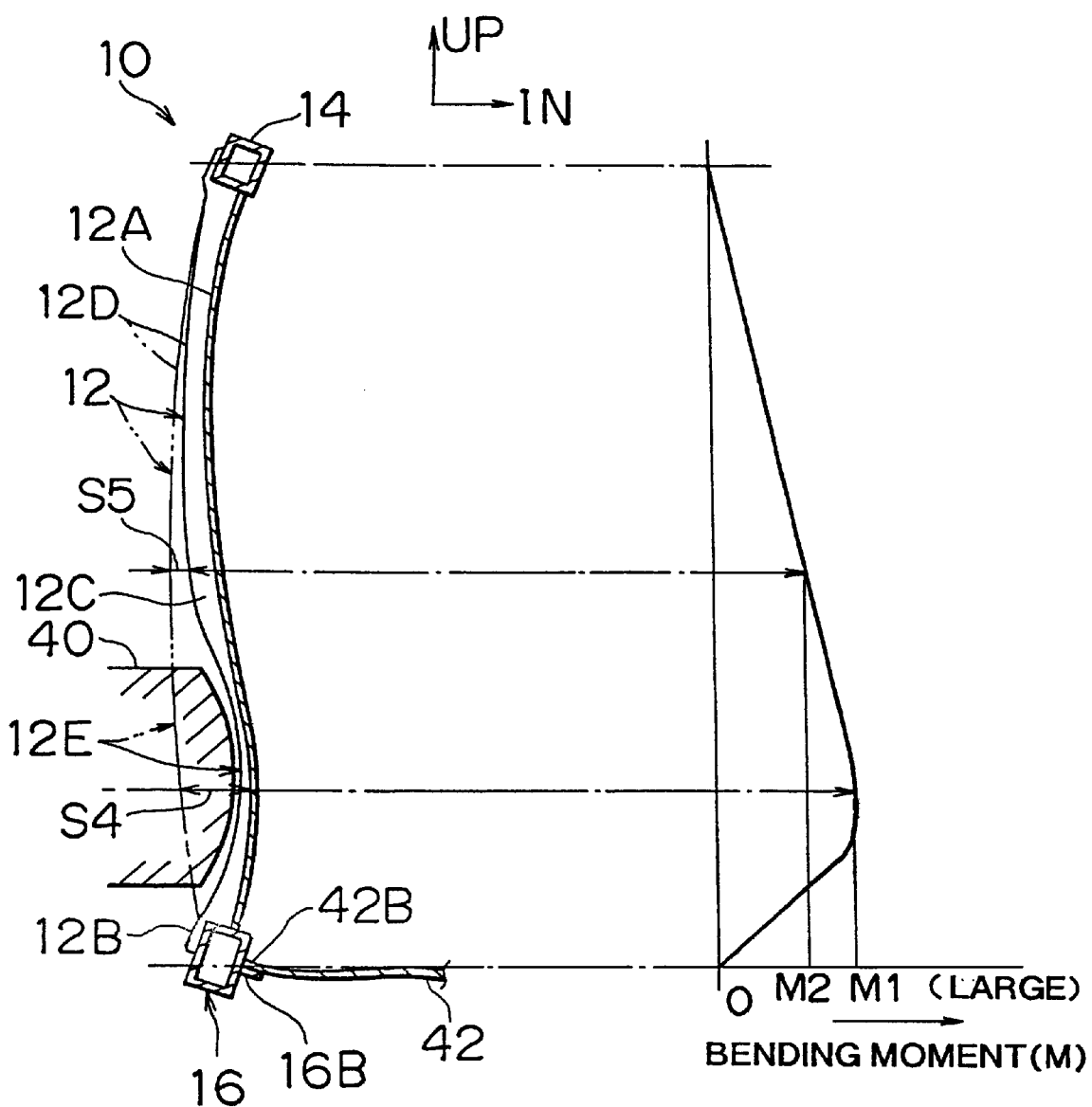
FIG. 18 is a diagram showing a relation between deformed state and bending moment in the third embodiment.

According to the pillar for a vehicle of the present embodiment, in the center pillar 12, the lower portion 12E has greater elongation with respect to a load as compared with the upper portion 12D. As a result, as shown in FIG. 18, when the bumper 40 of the other vehicle collided against the subject vehicle, the lower portion 12E of the center pillar 12 to which a great bending moment M1 is applied undergoes great displacement at the time of deformation (S4 in FIG. 17) and thus the lower portion 12E can receive a great load (W4 in FIG. 17). Therefore, it is possible to deform the lower portion 12E of the center pillar 12 in a desired deformation mode. As a result, the absorbing effect of impact energy can be enhanced.

Further, in case of collision of the vehicle, the upper portion 12D of the center pillar 12 to which a relatively small bending moment M2 is applied undergoes small displacement at the time of deformation (S5 or less in FIG. 17). Correspondingly, the upper portion 12D can receive a load (W5 in FIG. 5) without being deformed so much. As a result, as shown in FIG. 18, it is possible to deform the upper portion 12D of the center pillar 12 in a desired deformation mode. Thus, it is possible to reduce the movement of the upper portion 12D toward the inner side of the passenger compartment.

In the present embodiment, it is possible to easily form a portion having a great elongation with respect to a load by the T4 thermal-treatment which is a general-purpose treatment, and it is possible to easily form a portion having a small elongation (as compared with the portion subjected to the T4 thermal treatment) with respect to a load by the T6 thermal treatment which is a general-purpose treatment.

Further, in the present embodiment, by providing the lower portion 12E of the center pillar 12 with a desired deformation mode, the longitudinal width W of the center pillar 12 can be made substantially uniform in the vertical direction. Therefore, the portion 18B of the front side door opening 18 in the vicinity of the lower portion 12B of the center pillar 12 and the portion 19B of the rear side door opening 19 in the vicinity of the lower portion 12A of the center pillar 12 can be widened, and ease of getting in/out of the vehicle for passengers is facilitated.

Figure 19:
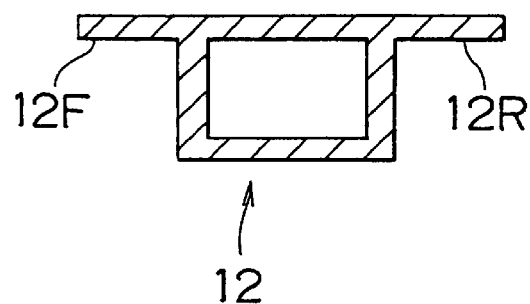
FIG. 19 is a sectional view of a pillar for a vehicle in the third embodiment.
Figure 20:
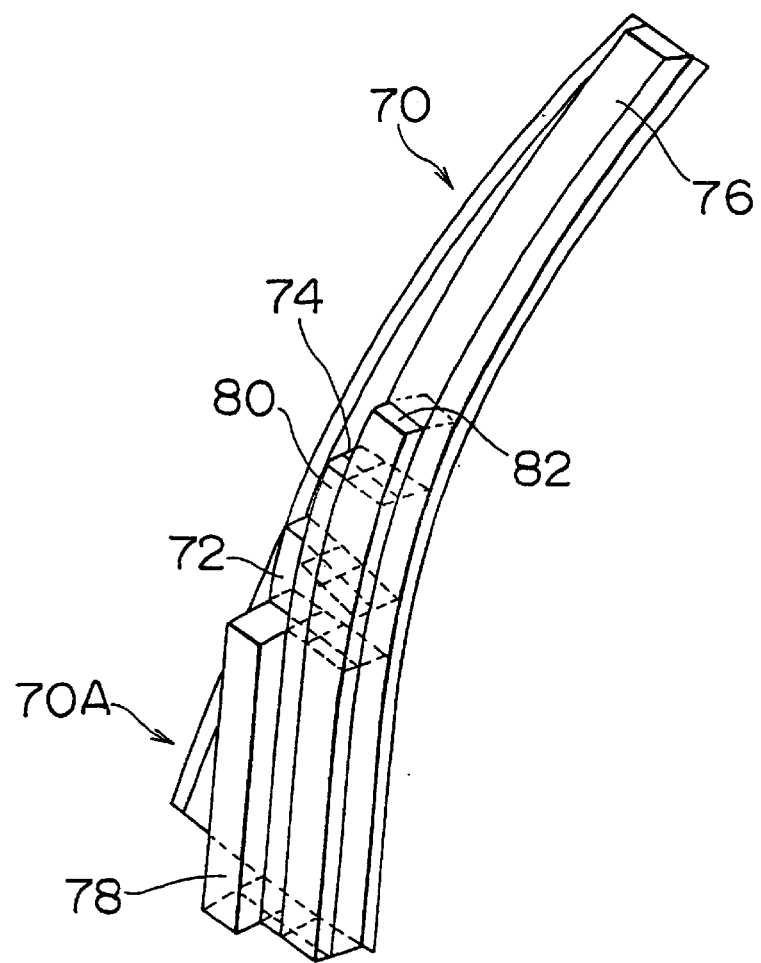
FIG. 20 is a perspective view showing a conventional pillar structure.

In the present embodiment, the center pillar 12 may have a closed cross section shape as shown in FIG. 19.

The upper portion 12D of the center pillar 12 may be subjected to a T8 thermal treatment (i.e., aluminum alloy is subjected to a solution treatment and then subjected to cold treatment such as forging, pressing or the like, then artificial aging), so as to reduce the elongation with respect to a load.

Further, a portion of the center pillar except the portion having great elongation with respect to a load may be hardened by cold working. A boundary between a portion of the center pillar having a great elongation and a portion of the center pillar having a small elongation with respect to a load is not limited to the substantially central portion in the longitudinal direction of the pillar.

In each of the above-explained embodiments, since the center pillar 12 is made of a light alloy, it is easy to lighten the pillar and to integrally form the parts of the pillar, and the productivity of the pillar is enhanced.

Normally, there exists many functional parts to be mounted to the center pillar, and fine deformation modes are required at the time of side impact. Therefore, if the pillar structure of the invention is applied to the center pillar 12, the applicability thereof is great, and the mass can be largely reduced.

What is claimed is:

1. A pillar structure of a pillar for a vehicle, comprising a pillar body (20) comprising a first member (22) having an opened cross section structure in which its opening (22A) is directed to the inside of a passenger compartment, a second member (24) having an opened cross section structure in which its opening (24A) is directed to the outside of the passenger compartment, and a connecting member (26) which is a cross-section switching portion for connecting the first and second member to each other.

2. A pillar structure according to claim 1, wherein the connecting member (26) is located at a substantially central portion of the pillar body (20) in its longitudinal direction, and the first member (22) is provided on an upper side of the connecting member (26).

3. A pillar structure according to claim 2, wherein the second member (24) constitutes a lower portion of the vehicle from the substantially central position of the pillar body (20) in the longitudinal direction.

4. A pillar structure according to claim 1, further comprising deformation means in the form of ribs (130, 132) provided in the cross section of the pillar body.

5. A pillar structure according to claim 1, wherein: the pillar body (20) further comprising reinforcing means (130) for connecting opposite portions of at least the second member (24).

6. A pillar structure according to claim 5, wherein the reinforcing means are lateral ribs (130).

7. A pillar structure according to claim 1, wherein the pillar body (20) further comprises vertical ribs (132) extending in a longitudinal direction of the pillar body in the cross section of the second member (24).

8. A pillar structure according to claim 7, wherein the ribs (132) are formed in the upper portion (22) of the pillar body (20) from the substantially central portion thereof in a vertical direction, and the ribs (132) are denser than those formed in the lower portion (24) of the pillar.

9. A pillar structure according to claim 1, wherein the pillar comprises a functional mounting portion (122) that mounts a functional part, and wherein the pillar body (20) and the functional part mounting portion are integrally formed together.

10. A pillar structure according to claim 9, wherein the functional mounting portion is formed in the opened cross section structure in which its opening is directed to the inside of the passenger compartment.

11. A pillar structure according to claim 9, wherein the functional part mounting portion is a hollow boss (58) provided on its inner side with a threaded portion.

12. A pillar structure according to claim 9, wherein the functional part is accommodated within the opened cross section of the pillar.

13. A pillar structure according to claim 1, wherein the first member (22) has the functional part (54) accommodated in a concave portion (56) thereof.

14. A pillar structure according to claim 1, wherein a displacement amount of the second member (24) against a load is greater than a displacement amount of the first member (22).

15. A pillar structure according to claim 1, wherein the second member (24) has been treated with a first thermal treatment and the first member (22) has been treated with a second thermal treatment.

16. A pillar structure according to claim 15, wherein the second thermal treatment comprises a solution treatment followed by aging at room temperature (T4 treatment).

17. A pillar structure according to claim 15, wherein the first thermal treatment comprises a solution treatment followed by an artificial aging (T6 treatment).

18. A pillar structure according to claim 15, wherein the first thermal treatment comprises a solution treatment followed by a cold treatment, and then by an artificial aging (T8 treatment).

19. A pillar structure according to claim 1, wherein the pillar body is made of a light alloy casting material.

20. A pillar structure according to claim 1, wherein the pillar body constitutes a center pillar for the vehicle.

* * * * *